(12) United States Patent
Wang et al.

(10) Patent No.: US 8,718,694 B2
(45) Date of Patent: May 6, 2014

(54) METHOD AND APPARATUS OF SIGNALING AND PROCEDURE TO SUPPORT UPLINK POWER LEVEL DETERMINATION

(75) Inventors: Jin Wang, Central Islip, NY (US); Joseph S. Levy, Merrick, NY (US); Stephen E. Terry, Northport, NY (US); Ulises Olvera-Hernandez, Kirkland (CA); Shankar Somasundaram, Deer Park, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 297 days.

(21) Appl. No.: 12/328,522

(22) Filed: Dec. 4, 2008

(65) Prior Publication Data

US 2009/0176525 A1    Jul. 9, 2009

Related U.S. Application Data

(60) Provisional application No. 61/012,281, filed on Dec. 7, 2007.

(51) Int. Cl.
*H04B 7/185* (2006.01)
*H04B 7/00* (2006.01)

(52) U.S. Cl.
USPC .......... 455/522; 455/450; 455/436; 455/63.1; 455/69; 370/329; 370/465; 370/342; 370/335; 370/337; 370/347

(58) Field of Classification Search
CPC .......... H04W 74/0833; H04W 56/001; H04W 56/0005; H04W 72/0406; H04W 72/042
USPC .......... 455/450, 522, 436, 63.1, 69; 370/329, 370/465, 342, 335, 337, 347

See application file for complete search history.

(56) References Cited

U.S. PATENT DOCUMENTS 5,883,887 A * 3/1999 Take et al. .................. 370/329
6,628,956 B2 * 9/2003 Bark et al. .................. 455/522

(Continued)

FOREIGN PATENT DOCUMENTS

| WO | 01/78252 | 10/2001 |
|----|----|----|
| WO | 03090026 A2 | 10/2003 |
| WO | 2004/100565 | 11/2004 |

OTHER PUBLICATIONS

Third Generation Partnership Project, "Technical Specification Group Radio Access Network; Requirements for Evolved UTRA (E-UTRA) and Evolved UTRAN (E-URAN)" (Release 7), 3GPP TR 25.913 V7.1.0 (Mar. 2006).

(Continued)

*Primary Examiner* — Bobbak Safaipour
(74) *Attorney, Agent, or Firm* — Volpe and Koenig, P.C.

(57) ABSTRACT

Method and apparatus are disclosed for determining a physical uplink power level for transmissions on a physical uplink channel. In one embodiment, a random access channel (RACH) uplink message is transmitted. The RACH uplink message includes a RACH message power level and/or a downlink pathloss figure. A downlink message including a power offset value is received. The physical uplink power level is set for transmissions on the physical uplink channel based on the power offset value. In another embodiment, a RACH uplink message is transmitted and a downlink message including a relative power offset value is received. The physical uplink power level for transmissions on the physical uplink channel is then set based on the relative power off set value.

5 Claims, 6 Drawing Sheets

(56) References Cited

U.S. PATENT DOCUMENTS

| | | | |
|---|---|---|---|
| 6,882,841 B1* | 4/2005 | Youn | 455/434 |
| 6,992,998 B1* | 1/2006 | Bhatoolaul et al. | 370/329 |
| 7,076,262 B1* | 7/2006 | Bhatoolaul et al. | 455/522 |
| 7,218,950 B2 | 5/2007 | Qiu et al. | |
| 7,343,172 B2* | 3/2008 | Hwang | 455/522 |
| 7,561,893 B2* | 7/2009 | Moulsley et al. | 455/522 |
| 8,054,791 B2 | 11/2011 | Vujcic | |
| 8,130,667 B2* | 3/2012 | Bertrand et al. | 370/252 |
| 8,233,451 B2* | 7/2012 | Marinier et al. | 370/331 |
| 8,526,986 B2* | 9/2013 | Fischer et al. | 455/511 |
| 2001/0038619 A1* | 11/2001 | Baker et al. | 370/335 |
| 2002/0009129 A1* | 1/2002 | Choi et al. | 375/149 |
| 2002/0077138 A1* | 6/2002 | Bark et al. | 455/522 |
| 2002/0115443 A1* | 8/2002 | Freiberg et al. | 455/450 |
| 2003/0114181 A1* | 6/2003 | Lee et al. | 455/522 |
| 2004/0008658 A1* | 1/2004 | Dahlman et al. | 370/342 |
| 2004/0082357 A1* | 4/2004 | Moulsley et al. | 455/522 |
| 2004/0264497 A1* | 12/2004 | Wang et al. | 370/465 |
| 2005/0105483 A1 | 5/2005 | Uehara et al. | |
| 2005/0143114 A1* | 6/2005 | Moulsley et al. | 455/522 |
| 2005/0232158 A1* | 10/2005 | Hondo | 370/241 |
| 2007/0165567 A1* | 7/2007 | Tan et al. | 370/329 |
| 2008/0096563 A1* | 4/2008 | Fischer et al. | 455/436 |
| 2008/0233941 A1* | 9/2008 | Jen | 455/418 |
| 2008/0233960 A1* | 9/2008 | Kangude et al. | 455/436 |
| 2008/0305822 A1* | 12/2008 | Li et al. | 455/522 |
| 2009/0042582 A1* | 2/2009 | Wang et al. | 455/450 |
| 2009/0046786 A1 | 2/2009 | Moulsley et al. | |
| 2009/0109912 A1* | 4/2009 | DiGirolamo et al. | 370/329 |
| 2009/0180443 A1* | 7/2009 | Kawasaki et al. | 370/331 |
| 2009/0197605 A1* | 8/2009 | Kawasaki | 455/437 |
| 2009/0290509 A1* | 11/2009 | Vujcic et al. | 370/254 |
| 2009/0312018 A1* | 12/2009 | Moulsley et al. | 455/435.1 |
| 2010/0074130 A1* | 3/2010 | Bertrand et al. | 370/252 |
| 2010/0172295 A1* | 7/2010 | Sagfors et al. | 370/328 |
| 2011/0039535 A1* | 2/2011 | Baker et al. | 455/422.1 |
| 2011/0081927 A1* | 4/2011 | Gerstenberger et al. | 455/506 |
| 2011/0292881 A1* | 12/2011 | Li et al. | 370/328 |
| 2012/0163231 A1* | 6/2012 | Bertrand et al. | 370/252 |

OTHER PUBLICATIONS

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.3.0 (Sep. 2008).

Third Generation Partnership Project, "Technical Specification Group Radio Access Network; Requirements for Evolved Utra (E-UTRA) and Evolved Utran (E-UTRAN)" (Release 7), 3GPP TR 25.913 V7.1.0 (Mar. 2006).

Third Generation Partnership Project, "Technical Specification Group Radio Access Network; Requirements for Evolved Utra (E-UTRA) and Evolved Utran (E-UTRAN)" (Release 7), 3GPP TR 25.913 V7.3.0 (Mar. 2006).

Third Generation Partnership Project, "Technical Specification Group Radio Access Network; Physical layer aspects for evolved Universal Terrestrial Radio Access (UTRA)" (Release 7), 3GPP TR 25.814 V7.1.0 (Oct. 2006).

Third Generation Partnership Project, "Technical Specification Group Radio Access Network; Evolved Universal Terrestrial Radio Access (E-UTRA); Physical Channels and Modulation" (Release 8), 3GPP TS 36.211 V8.0.0 (Sep. 2007).

Third Generation Partnership Project, "Technical Specification Group Radio Access Network; Evolved Universal Terrestrial Radio Access (E-UTRA); Physical Channels and Modulation" (Release 8), 3GPP TS 36.211 V8.4.0 (Sep. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2" (Release 8), 3GPP TS 36.300 V8.2.0 (Oct. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2" (Release 8), 3GPP TS 36.300 V8.6.0 (Sep. 2008).

Third Generation Partnership Project, "Technical Specification Group Radio Access Network; Evolved Universal Terrestrial Radio Access (E-UTRA) Medium Access Control (Mac) protocol specification (Release 8)," 3GPP TS 36.321 V1.0.0 (Sep. 2007).

Third Generation Partnership Project, "Technical Specification Group Radio Access Network; Physical layer procedures (FDD) (Release 8)", 3GPP TS 25.214, V8.3.0, (Sep. 2008).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.8.0 (Dec. 2005).

Third Generation Partnership Project, "Technical Specification Group Radio Access Network; Physical channels and mapping of transport channels onto physical channels (FDD) (Release 6)," 3GPP TS 25.211 V6.8.0 (Sep. 2007).

Third Generation Partnership Project, "Technical Specification Group Radio Access Network; Physical channels and mapping of transport channels onto physical channels (FDD) (Release 6)," 3GPP TS 25.211 V6.9.0 (Nov. 2007).

Third Generation Partnership Project, "Technical Specification Group Radio Access Network; Physical channels and mapping of transport channels onto physical channels (FDD) (Release 7)," 3GPP TS 25.211 V7.3.0 (Sep. 2007).

Third Generation Partnership Project, "Technical Specification Group Radio Access Network; Physical channels and mapping of transport channels onto physical channels (FDD) (Release 7)," 3GPP TS 25.211 V7.6.0 (May 2008).

Third Generation Partnership Project, "Technical Specification Group Radio Access Network; Physical channels and mapping of transport channels onto physical channels (FDD) (Release 8)," 3GPP TS 25.211 V8.2.0 (Sep. 2008).

Third Generation Partnership Project, "Technical Specification Group Radio Access Network; Physical layer procedures (FDD) (Release 1999)," 3GPP TS 25.214 V3.12.0 (Mar. 2003).

Third Generation Partnership Project, "Technical Specification Group Radio Access Network; Physical layer procedures (FDD) (Release 4)," 3GPP TS 25.214 V4.6.0 (Mar. 2003).

Third Generation Partnership Project, "Technical Specification Group Radio Access Network; Physical layer procedures (FDD) (Release 5)," 3GPP TS 25.214 V5.11.0 (Jun. 2005).

Third Generation Partnership Project, "Technical Specification Group Radio Access Network; Physical layer procedures (FDD) (Release 6)," 3GPP TS 25.214 V6.11.0 (Dec. 2006).

Third Generation Partnership Project, "Technical Specification Group Radio Access Network; Physical Layer Procedures (FDD) (Release 7)." 3GPP TS 25.214, V7.9.0, (Jun. 2008).

Third Generation Partnership Project, "Technical Specification Group Radio Access Network; Radio Resource Control (RRC) protocol specification (Release 1999)," 3GPP TS 25.331 V3.21.0 (Dec. 2004).

Third Generation Partnership Project, "Technical Specification Group Radio Access Network; Radio Resource Control (RRC); Protocol Specification (Release 4)," 3GPP TS 25.331 V4.17.0 (Mar. 2005).

Third Generation Partnership Project, Technical Specification Group Radio Access Network; Radio Resource Control (RRC); Protocol Specification (Release 5), 3GPP TS 25.331 V5.20.0 (Sep. 2007).

(56) References Cited

OTHER PUBLICATIONS

Third Generation Partnership Project, "Technical Specification Group Radio Access Network; Radio Resource Control (RRC); Protocol Specification (Release 5)," 3GPP TS 25.331 V5.22.1 (Aug. 2008).

Third Generation Partnership Project, Technical Specification Group Radio Access Network; Radio Resource Control (RRC); Protocol Specification (Release 6), 3GPP TS 25.331 V6.15.0 (Sep. 2007).

Third Generation Partnership Project, "Technical Specification Group Radio Access Network; Radio Resource Control (RRC); Protocol Specification (Release 6)," 3GPP TS 25.331 V6.19.0 (Sep. 2008).

Third Generation Partnership Project, Technical Specification Group Radio Access Network; Radio Resource Control (RRC); Protocol Specification (Release 7), 3GPP TS 25.331 V7.6.0 (Sep. 2007).

Third Generation Partnership Project, "Technical Specification Group Radio Access Network; Radio Resource Control (RRC); Protocol Specification (Release 7)," 3GPP TS 25.331 V7.10.0 (Sep. 2008).

Third Generation Partnership Project, Technical Specification Group Radio Access Network; Radio Resource Control (RRC); Protocol Specification (Release 8); 3GPP TS 25.331 V8.0.0 (Sep. 2007).

Third Generation Partnership Project, "Technical Specification Group Radio Access Network; Radio Resource Control (RRC); Protocol Specification (Release 8)," 3GPP TS 25.331 V8.4.0 (Sep. 2008).

Third Generation Partnership Project, "Technical Specification Group Radio Access Network; Physical Layer Procedures (FDD) (Release 7)." 3GPP TS 25.214, V7.6.0 (Sep. 2007).

Third Generation Partnership Project, "Technical Specification Group Radio Access Network; Radio Resource Control (RRC); Protocol Specification (Release 4)," 3GPP TS 25.331 V4.19.0 (May 2008).

Third Generation Partnership Project, Technical Specification Group Radio Access Network; Evolved Universal Terrestrial Radio Access (E-UTRA); Physical Layer Procedures (Release 8), 3GPP TS 36.213 V8.0.0 (Sep. 2007).

Third Generation Partnership Project, Technical Specification Group Radio Access Network; Evolved Universal Terrestrial Radio Access (E-UTRA); Physical Layer Procedures (Release 8), 3GPP TS 36.213 V8.4.0 (Sep. 2008).

* cited by examiner

METHOD AND APPARATUS OF SIGNALING AND PROCEDURE TO SUPPORT UPLINK POWER LEVEL DETERMINATION

CROSS REFERENCE TO RELATED APPLICATION(S)

This application claims the benefit of U.S. Provisional Patent Application No. 61/012,281, filed on Dec. 7, 2007, which is incorporated by reference as if fully set forth.

FIELD OF INVENTION

This application is related to wireless communications.

BACKGROUND

The objective of Evolved UTRA and UTRAN is to develop a radio access network towards a high-data-rate, low-latency, packet-optimized system with improved system capacity and coverage. In order to achieve this, an evolution of the radio interface as well as the radio network architecture should be considered. For example, instead of using CDMA which is currently used in 3GPP, OFDMA and FDMA are proposed air interface technologies to be used in the downlink and uplink transmissions, respectively. For example, one big change is to apply all packet switched services in LTE, which means all the voice calls will be made on a packet switched basis.

FIG. 1 illustrates a conventional packet-optimized radio access network, in this case a UMTS Terrestrial Radio Access Network (UTRAN). The UTRAN has one or more radio network controllers (RNCs) 104 and base stations 102, referred to as Node-Bs or evolved Node-Bs (eNBs) by 3GPP, which collectively provide for the geographic coverage for wireless communications with WTRUs 100, referred to as user equipments (UEs) by 3 GPP. The geographic coverage area of a Node-B 102 is referred to as a cell. The UTRAN is connected to a core network (CN) 106.

In UMTS, the initial power determined for PRACH message (after initial RACH access preamble) is based on following equation:

$$P_{message-control} = P_{preamble} + \text{Power offset } P_{p-m}; \quad \text{Equation (1)}$$

where $P_{preamble}$ is the power of the last transmitted preamble, $P_{p-m}$ (in dB) is the signaled power offset between the last transmitted preamble and the control part of the message.

For uplink dedicated physical control channel (DPCCH), the power of the first DPCCH transmission is established as follows:

$$\text{DPCCH\_Initial\_power} = \text{DPCCH\_Power\_offset} - \text{CPICH\_RSCP}; \quad \text{Equation (2)}$$

where DPCCH_Power_offset is signaled having the value of IE "DPCCH Power offset" in IE "Uplink DPCH power control info"; and CPICH_RSCP is the received signal code power of the CPICH measured by the wireless transmit receive unit (WTRU).

For Evolved UTRA the uplink (UL) power control is handed in a different manner. The setting of the WTRU Transmit Power $P_{pusch}$ for the physical uplink shared channel (PUSCH transmissions are defined by:

$$P_{pusch} = \min(P_{max}, 10 \log_{10}(M) + P_o + \alpha \cdot PL + \Delta_{mcs} + f(\Delta_i)); \quad \text{Equation (3)}$$

where:
- $P_{max}$ is the maximum allowed power that depends on the UE power class;
- M is the number of assigned resource blocks as indicated in the UL scheduling grant;
- $P_o$ is a UE specific parameter with 1 dB resolution;
- α is cell specific path loss compensation factor (can be set to one to allow full path loss compensation) that has 8 values from 0.4 to 1 in steps of 0.1 with one of the possible values being zero;
- PL is the downlink pathloss calculated in the UE from a RSRP measurement and signaled RS transmit power;
- $\Delta_{mcs}$ is signaled by RRC ($\Delta_{mcs}$ table entries can be set to zero);
- MCS signaled in each UL scheduling grant; and
- $\Delta_i$ is a UE specific correction value and is defined differently dependent on scheduling as given by:
  - Scheduled
    - $\Delta_i$ is included in each UL scheduling grant;
    - Function $f(*)$ signaled via higher layers; and
    - $f(*)$ represents either accumulation or current absolute value;
  - Not scheduled
    - $\Delta_i$ is included in each DL scheduling assignment or jointly coded with other UE specific correction values on a TPC PDCCH;
    - The UE attempts to detect a TPC PDCCH and a DL scheduling frame on every subframe except when in DRX;
    - The $\Delta_i$ from a downlink (DL) scheduling assignment overrides any command from a TPC PDCCH when both are received in a given subframe; and
    - Function $f(*)$ represents accumulation only.

The setting of the UE Transmit power $P_{pucch}$ for the physical uplink control channel (PUCCH) transmissions is defined by:

$$P_{pucch} = \min(P_{max}, 10 \log_{10}(M_{pucch}) + P_{o\_pucch} + PL + \Delta_{mcs\_pucch} + g(\Delta_j)) \quad \text{Equation (4)}$$

where:
- $M_{pucch}$ is the number of assigned resource blocks for the PUCCH;
- $\Delta_{mcs\_pucch}$ is signaled by RRC ($\Delta_{mcs\_pucch}$ table entries can be set to zero);
- MCS is signaled using higher layer signaling;
- $P_{o\_pucch}$ is a UE specific parameter with 1 dB resolution; and
- $\Delta_j$ is a UE specific correction value, also referred to as a TPC command, included in a DL scheduling assignment or sent jointly coded with other UE specific correction values on a TPC PDCCH;
  - The UE attempts to detect a TPC PDCCH and a DL scheduling frame on every subframe except when in DRX;
  - The TPC command from a DL scheduling assignment overrides any command from a TPC PDCCH when both are received in a given subframe; and
  - Function $g(*)$ represents accumulation.

The power control parameters are signaled to the UE prior to transmission in the grant message sent by the eNB, except for the PL parameter which is measured at the UE.

For both UMTS cases, the initial power level is not determined and signaled by the eNB. Instead, the power level is determined by the UE based on the power offset value and either previous transmission power (for RACH message) or measured signal strength (for DPCCH). This allows the UE to set its initial power to an acceptable level. However, in the case of Enhance UTRA, the power control is signaled by the eNB to the UE and the eNB has no knowledge as to the power transmitted by the UE in its RACH signal. Therefore, improved controls or signaling needs to be added to the power control so that the UE can transmit at the correct power after the initial RACH process.

SUMMARY

Example embodiments of the application include methods and apparatus for determining the physical uplink power level for transmissions on a physical uplink channel.

In one embodiment, a random access channel (RACH) uplink message is transmitted. The RACH uplink message includes a RACH message power level and/or a downlink pathloss figure. A downlink message including a power offset value is received. The physical uplink power level is set for transmissions on the physical uplink channel based on the power offset value.

In another embodiment, a RACH uplink message is transmitted and a downlink message including a relative power offset value is received. The physical uplink power level for transmissions on the physical uplink channel is then set based on the relative power offset value.

BRIEF DESCRIPTION OF THE DRAWING(S)

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
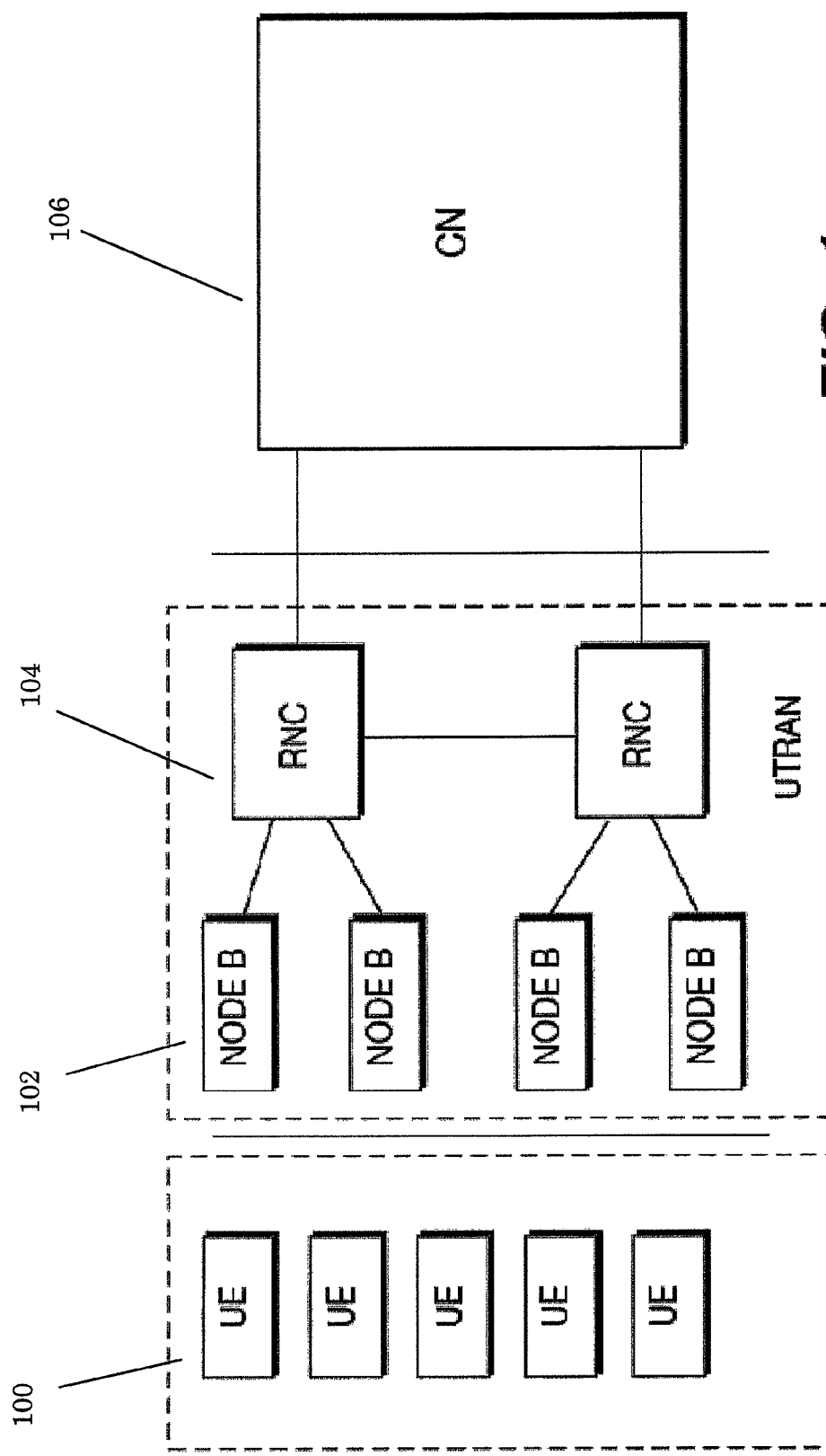
FIG. 1 is a schematic block diagram illustrating a conventional packet-optimized radio access network, such as a UTRAN.
Figure 2:
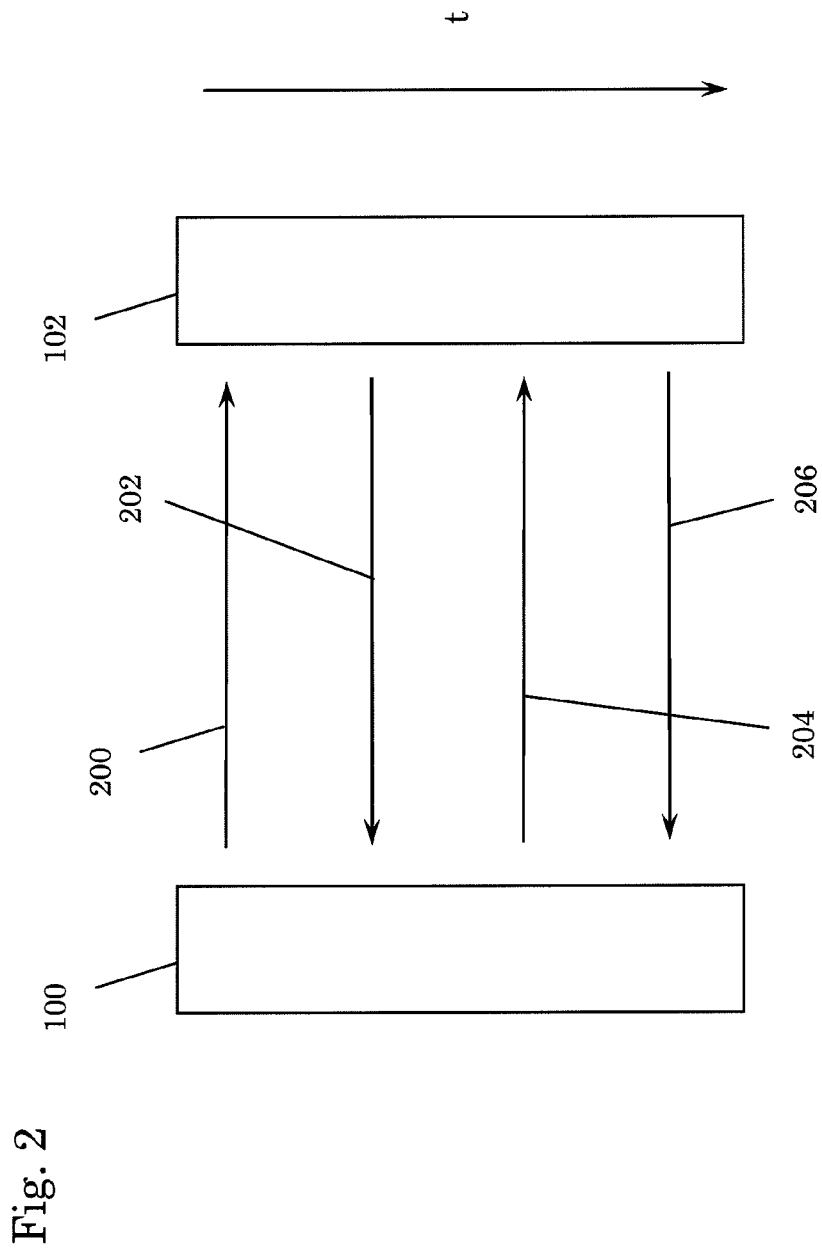
FIG. 2 is a schematic signal diagram illustrating an example contention based random access procedure.

The present application includes methods and apparatus for determining the desired physical uplink power level for transmissions on a physical uplink channel, using random access channel (RACH) communications. FIG. 2 is a schematic signal diagram illustrating an example contention based random access procedure. A RACH message sequence in this example includes random access preamble 200, which is transmitted to eNB 102 from WTRU 100. Upon receipt of random access preamble 200, eNB 102 responds to WTRU 100 by transmitting random access response signal 202. At the scheduled time, WTRU 100 transmits first scheduled transmission 204 to eNB 102, which then transmits contention resolution signal 206 to WTRU 100.

Figure 3:
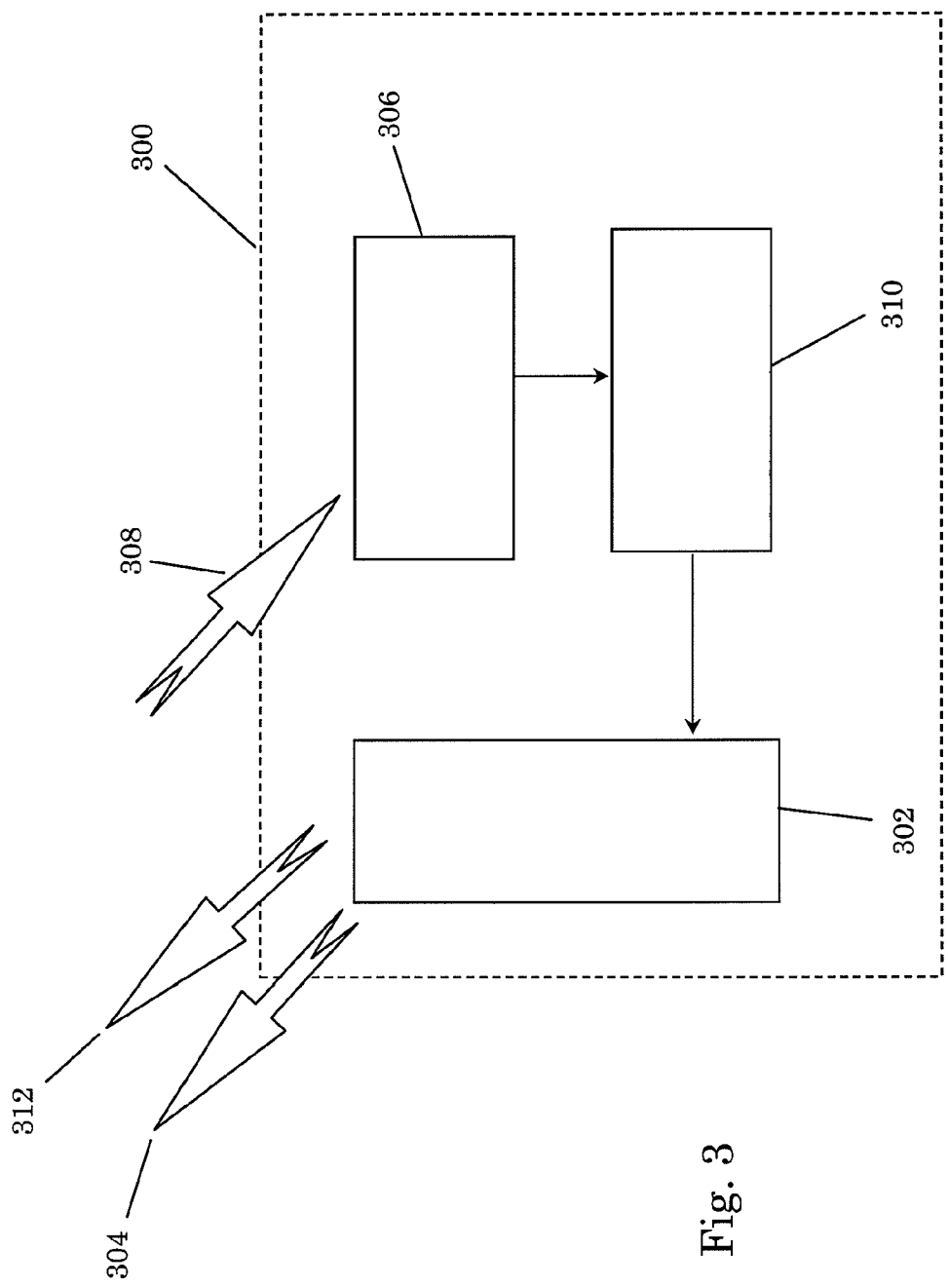
FIG. 3 is a schematic block diagram illustrating certain features of an example WTRU according to the present application.

FIG. 3 illustrates example WTRU 300 which is configured to determine the physical uplink power level for transmissions on a physical uplink channel, using RACH communications. Example WTRU 300 includes: transmitter 300; receiver 306; and physical uplink power level processor 310.

Transmitter 302 is configured to transmit RACH uplink message 304 that includes information that may be used by the eNB to determine a desired uplink physical uplink power level. This information may include the RACH message power level at which RACH uplink message 304 was transmitted or a downlink pathloss figure. The downlink pathloss figure may be a measured power of a downlink signal received by WTRU 300 or may be a downlink pathloss calculated from the measured power of a downlink signal, which has a known transmission power level. Example transmitter 302 of WTRU 300 may be configured to transmit RACH uplink message 304 as part RACH preamble 200 (shown in FIG. 2) or first scheduled RACH message 204.

Example receiver 306 of WTRU 300 is configured to receive downlink message 308, which includes a power offset value for transmissions on the physical uplink channel. Downlink signal 308 may be received in either random access response signal 202 or contention resolution signal 206, or as part of a control signal on the physical downlink control channel (PDCCH).

In an example embodiment, receiver 306 may be further configured to receive a random access response signal 202, which has a predetermined transmission power level, following transmission of RACH preamble 204. In this embodiment, WTRU 300 further includes a pathloss processor (not shown), which is coupled to both receiver 306 and transmitter 302. The pathloss processor is configured to calculate the downlink pathloss based on the received power of random access response signal 202 and its predetermined transmission power level, before transmission of the RACH uplink signal. Transmitter 302 is configured to transmit the RACH uplink message, which includes the calculated downlink pathloss as the pathloss figure, in first scheduled RACH message 204.

Physical uplink power level processor 310 is coupled to receiver 302 and configured to set the physical uplink power level for transmissions on one or more physical uplink channels based on the received power offset value. The physical uplink channels for which physical uplink power level processor 310 may set the physical uplink power level include the physical uplink control channel (PUCCH) or the physical uplink shared channel (PUSCH).

It is contemplated that example receiver 306 of WTRU 300 may also be coupled to transmitter 302 and further configured to receive a broadcast channel (BCH) message, which may include an enable/disable indication for example RACH uplink message 304. Transmitter 302 may also be further configured to enable or disable transmission of RACH uplink message 304 based on this enable/disable indication.

Figure 4:
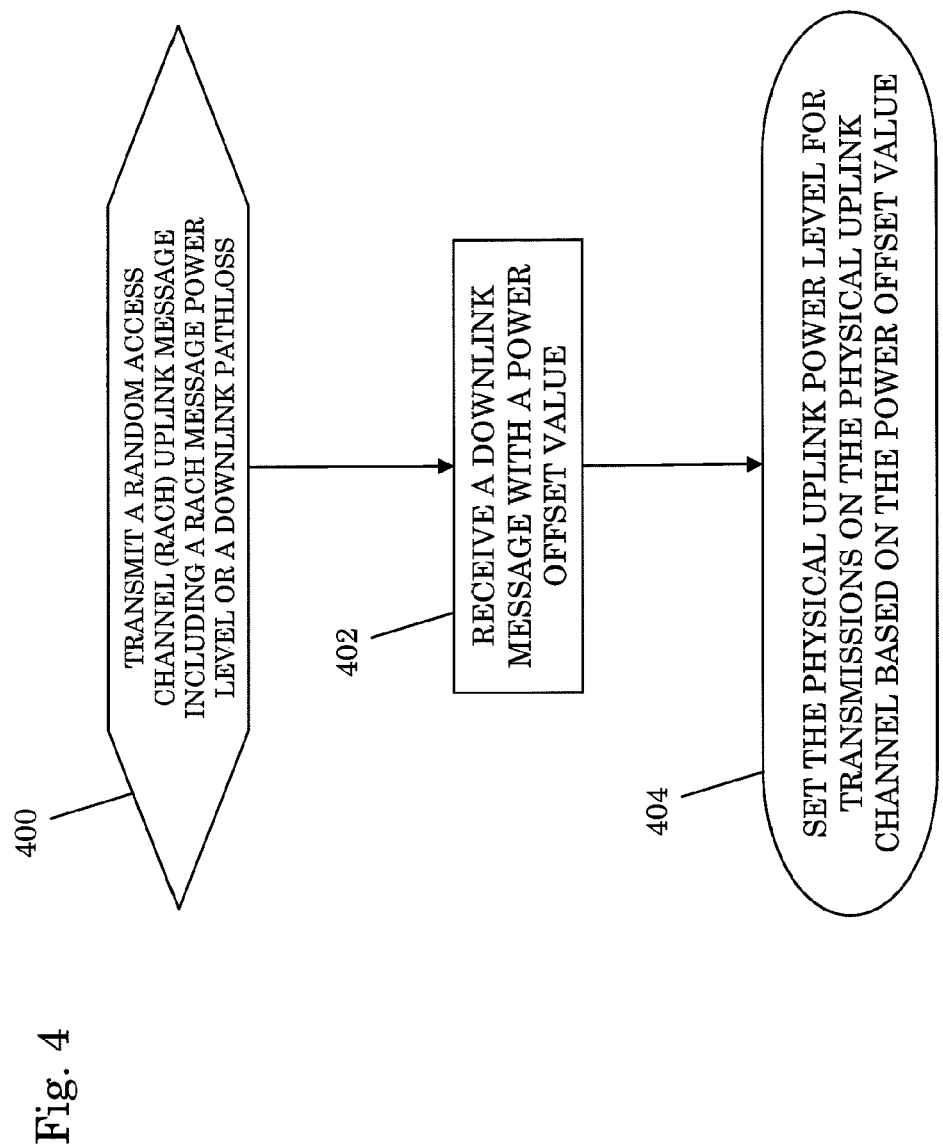
FIG. 4 is a flowchart illustrating an example method for determining a physical uplink power level for transmissions on a physical uplink channel.

FIG. 4 illustrates an example method for determining a physical uplink power level for transmissions on a physical uplink channel, according to an embodiment of the present application. This example method may be performed using a WTRU configured to perform the processes of this method, for example, example WTRU 300 of FIG. 3.

A RACH uplink message is transmitted, step 400, which includes the RACH message power level and/or a downlink pathloss figure. The downlink pathloss figure may be a measured power of a received downlink signal or may be a downlink pathloss calculated from the measured power of a downlink signal, which has a known transmission power level. The example RACH uplink message may be transmitted as part RACH preamble 200 (shown in FIG. 2) or first scheduled RACH message 204.

In an example embodiment of the method of FIG. 4, a random access response signal 202, which has a predetermined transmission power level, may be received following transmission of RACH preamble 204. In this embodiment, the downlink pathloss is calculated based on the received power of random access response signal 202 and its predetermined transmission power level, before transmission of the RACH uplink signal. The RACH uplink message, which includes the calculated downlink pathloss as the pathloss figure, is then transmitted in first scheduled RACH message 204.

A downlink message, which includes a power offset value, is received, step 402. The downlink signal may be received on either the RACH, in either random access response signal 202 or contention resolution signal 206, or as part of a control signal on the PDCCH.

The physical uplink power level for transmissions on the physical uplink channel is then set based on the power offset value, step 404. The physical uplink channels for which the physical uplink power level is set in step 404 may include the PUCCH or the PUSCH.

It is contemplated that the example method of FIG. 4 may also include receiving a broadcast channel (BCH) message, which may include an enable/disable indication for the RACH uplink message. This enable/disable indication may enable or disable transmission of the RACH uplink message in step 400.

Figure 5:
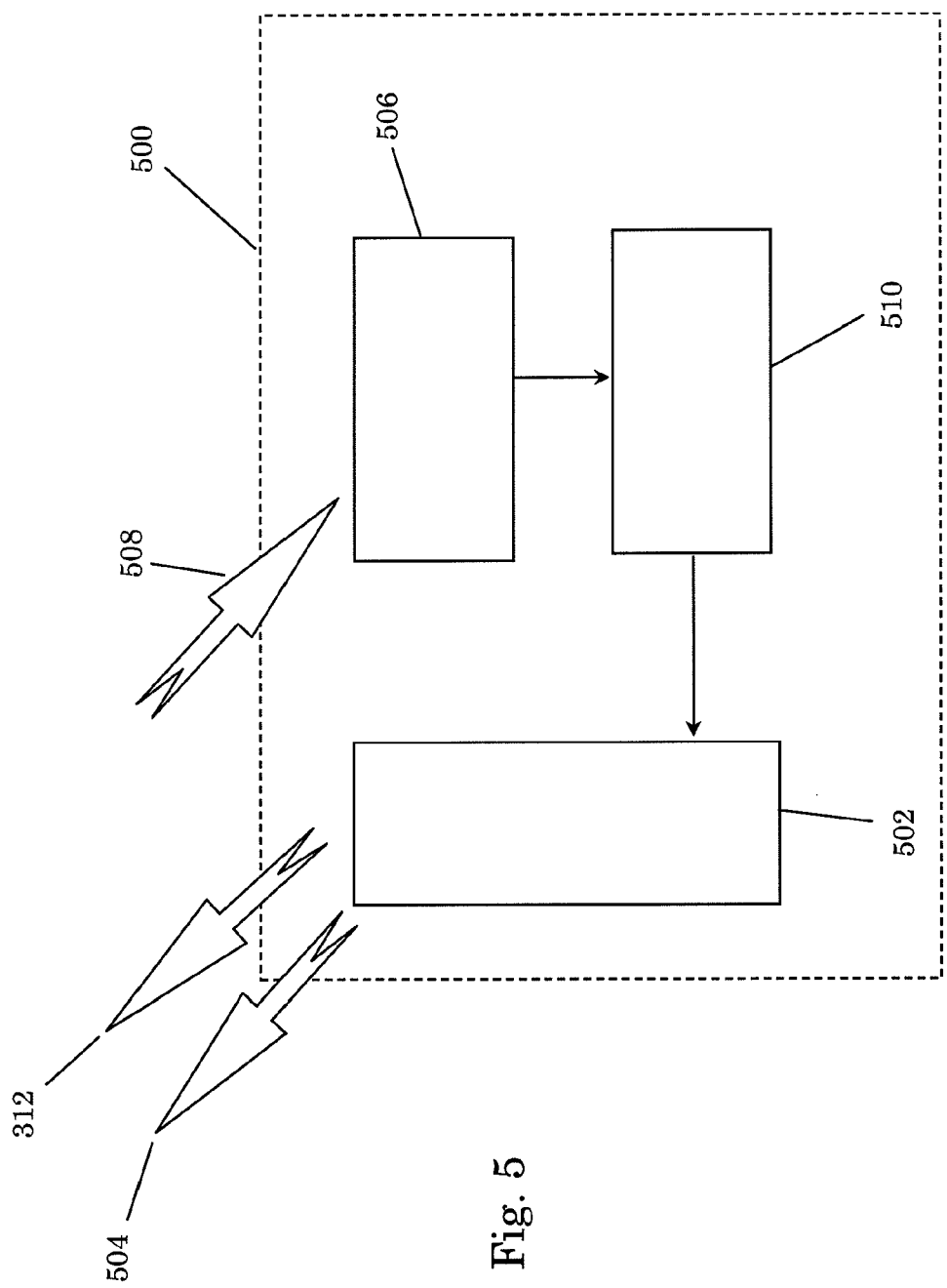
FIG. 5 is a schematic block diagram illustrating certain features of another example WTRU according to the present application.

FIG. 5 illustrates alternative example WTRU 500 which is configured to determine the physical uplink power level for transmissions on a physical uplink channel, using RACH communications. Example WTRU 500 includes: transmitter 500; receiver 506; and physical uplink power level processor 510.

Transmitter 502 is configured to transmit RACH uplink message 504. Example transmitter 502 of WTRU 500 may be configured to transmit RACH uplink message 504 as part RACH preamble 200 (shown in FIG. 2) or first scheduled RACH message 204.

Example receiver 506 of WTRU 500 is configured to receive downlink message 508, which includes a relative power offset value for transmissions on the physical uplink channel. This relative power offset value is determined based on a difference between the received power level of RACH uplink message 504 by the eNB and the desired received power level for uplink signals. Downlink signal 508 may be received in either random access response signal 202 or contention resolution signal 206, or as part of a control signal on the PDCCH.

Physical uplink power level processor 510 is coupled to receiver 502 and configured to set the physical uplink power level for transmissions on one or more physical uplink channels based on the received relative power offset value. The physical uplink channels for which physical uplink power level processor 510 may set the physical uplink power level include the PUCCH or the PUSCH.

Figure 6:
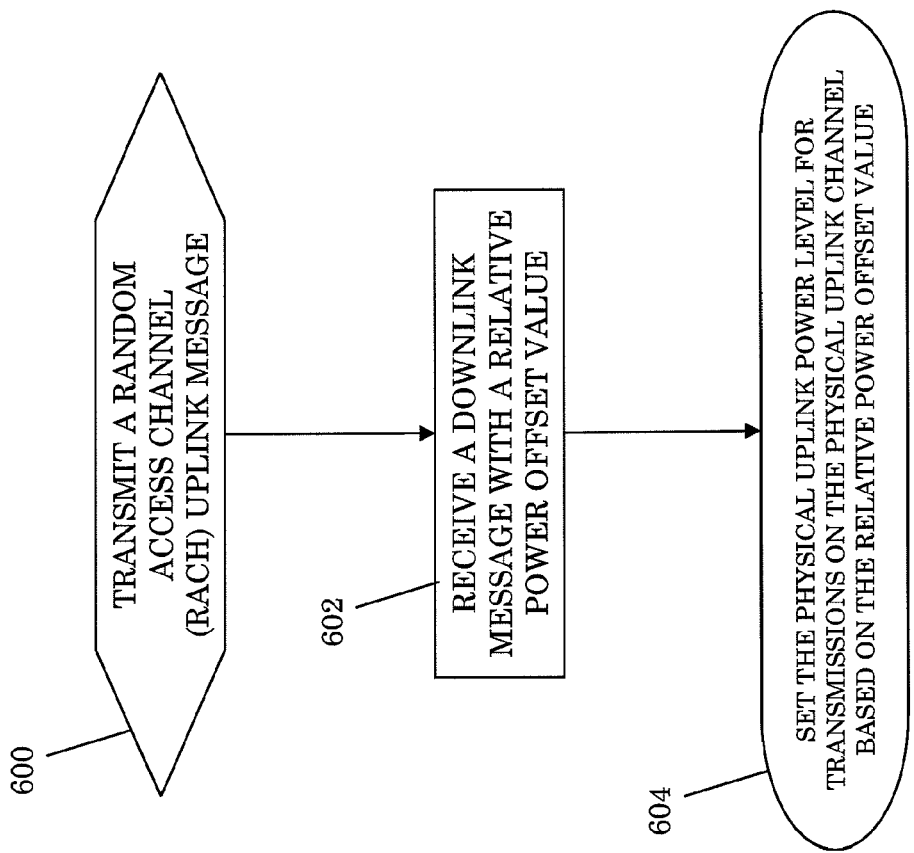
FIG. 6 is a flowchart illustrating another example method for determining a physical uplink power level for transmissions on a physical uplink channel.

FIG. 6 illustrates another example method for determining a physical uplink power level for transmissions on a physical uplink channel, according to an embodiment of the present application. This example method may be performed using a WTRU configured to perform the processes of this method, for example, example WTRU 500 of FIG. 5.

A RACH uplink message is transmitted, step 600. The example RACH uplink message may be transmitted as part RACH preamble 200 (shown in FIG. 2) or first scheduled RACH message 204.

A downlink message, which includes a relative power offset value, is received, step 602. The downlink signal may be received in either random access response signal 202 or contention resolution signal 206, or as part of a control signal on the PDCCH.

The physical uplink power level for transmissions on the physical uplink channel is then set based on the relative power offset value, step 604. The physical uplink channels for which the physical uplink power level is set in step 604 may include the PUCCH or the PUSCH.

Although the features and elements are described in particular combinations, each feature or element can be used alone without the other features and elements or in various combinations with or without other features and elements. The methods provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. The various processor described herein may be embodied in separate elements. Alternatively, it is contemplated that two or more of these example processors may coexist within a single processor element.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for determining a physical uplink power level for transmitting a message on a physical uplink channel, the method comprising:

transmitting a random access channel (RACH) preamble to an NodeB based on a pathloss figure;

receiving a response signal and a power offset from the NodeB, wherein the power offset is received on a physical control channel, and wherein the response signal is received on a different channel than the power offset; and setting the physical uplink power level for transmission of the message on the physical uplink channel to the NodeB based on the power offset.

2. A wireless transmit/receive unit (WTRU) configured to determine a physical uplink power level for transmitting a message on a physical uplink channel, the WTRU comprising:
- a transmitter configured to transmit a random access channel (RACH) preamble to an NodeB based on a pathloss figure;
- a receiver configured to receive a response signal and a power offset from the NodeB, wherein the power offset is received on a physical control channel, and wherein the response signal is received on a different channel than the power offset; and
- a processor configured to set the physical uplink power level for transmission of the message on the physical uplink channel to the NodeB based on the power offset.

3. The method of claim 1, wherein the method is implemented by a wireless transmit/receive unit (WTRU).

4. The method of claim 1, further comprising:
receiving a broadcast channel (BCH).

5. The WTRU of claim 2, wherein the receiver is further configured to receive a broadcast channel (BCH).

* * * * *